United States Patent
Moore

(10) Patent No.: US 10,635,831 B1
(45) Date of Patent: Apr. 28, 2020

(54) METHOD TO ACHIEVE BETTER SECURITY USING A MEMORY PROTECTION UNIT

(71) Applicant: Ralph Crittenden Moore, Costa Mesa, CA (US)

(72) Inventor: Ralph Crittenden Moore, Costa Mesa, CA (US)

( * ) Notice: Subject to any disclaimer, the term of this patent is extended or adjusted under 35 U.S.C. 154(b) by 296 days.

(21) Appl. No.: 15/863,913

(22) Filed: Jan. 6, 2018

(51) Int. Cl.
*G06F 21/62* (2013.01)
*G06F 21/79* (2013.01)

(52) U.S. Cl.
CPC .......... *G06F 21/6218* (2013.01); *G06F 21/79* (2013.01)

(58) Field of Classification Search
CPC combination set(s) only.
See application file for complete search history.

(56) References Cited

U.S. PATENT DOCUMENTS

| | | | | |
|---|---|---|---|---|
| 2004/0078547 A1* | 4/2004 | David | ................... | G06F 9/4843 712/1 |
| 2007/0255875 A1* | 11/2007 | Weiberle | ............. | G06F 9/30181 710/116 |
| 2007/0300219 A1* | 12/2007 | Devaux | ............... | G06F 12/1491 718/1 |
| 2008/0189559 A1* | 8/2008 | Delfs | .................. | G06F 12/1408 713/193 |
| 2011/0202739 A1* | 8/2011 | Grisenthwaite | ..... | G06F 12/1491 711/163 |
| 2013/0166848 A1* | 6/2013 | Miyazaki | ............ | G06F 12/0804 711/143 |
| 2013/0191617 A1* | 7/2013 | Ishikawa | ................. | G06F 12/14 712/216 |
| 2015/0032996 A1* | 1/2015 | Koeberl | ................ | G06F 9/3802 712/205 |
| 2015/0052325 A1* | 2/2015 | Persson | ............... | G06F 12/1458 711/163 |
| 2015/0052616 A1* | 2/2015 | Hutchison | ............... | G06F 21/53 726/27 |
| 2017/0039085 A1* | 2/2017 | Meriac | ..................... | G06F 21/74 |
| 2018/0173644 A1* | 6/2018 | Koeberl | .............. | G06F 12/1416 |

\* cited by examiner

*Primary Examiner* — Malcolm Cribbs

(57) ABSTRACT

Provides a method to control the Background Region of a Memory Protection Unit (MPU) in order to create isolated privileged tasks (ptasks), which are an important step in the process of converting ordinary tasks to unprivileged tasks (utasks) and which also offer improved security and reliability in privileged mode.

12 Claims, 3 Drawing Sheets

US 10,635,831 B1

METHOD TO ACHIEVE BETTER SECURITY USING A MEMORY PROTECTION UNIT

This application claims the priority of U.S. provisional application 62/454579 filed on Feb. 3, 2017. It is incorporated by reference in its entirety.

BACKGROUND

The following discussion centers on embedded systems because their requirements are well understood. Other less well-understood systems may have similar requirements.

Encryption, authentication, and other security methods work well to protect data and program updates passing through the Internet. That is, unless one end can easily be hacked to steal secret keys and possibly implant malware for future activation. Then, unbeknownst to system operators, confidential information is being stolen daily and possible major service disruptions lie ahead.

The Cortex-M processor architecture was introduced in 2005 and is intended for medium-size embedded systems. Since then, hundreds of different Micro Controller Units (MCUs) based upon this architecture have been developed by the semiconductor industry and they are used in thousands of products developed by device manufacturers. These products are being connected to the Internet and becoming part of the Internet of Things (IoT). Unfortunately, unlike larger processors which have Memory Management Units (MMUs) and strong built-in security, MCUs have neither. Hence, in the vast majority of cases, embedded devices using these MCUs have little or no protection against hacking.

Most Cortex-M MCUs, both in the field and under development, have Memory Protection Units (MPUs). However, because of a combination of tight schedules to deliver product designs on time and difficulty using the Cortex-M MPU, these MPUs are either under-used or not used at all. Also, the apparent large waste of memory due to the MPU requirements that MPU regions be powers-of-two in size and that they be aligned on size boundaries has been an additional impediment for adoption by systems with limited memories. Yet for products using these MCUs, the MPU and the SVC instruction are the only means of achieving acceptable security.

We are therefore faced with a situation where a large number of existing embedded products have inadequate security for the IoT. Equally bad, new products also have inadequate security. Hence, there is a strong need for methods to improve the security of both existing products and products in late development. It thus behooves us to figure out how to make better use of MPUs in these products.

SUMMARY OF THE INVENTION

The inventive subject matter, herein, applies to MPUs that support a Background Region (BR) in privileged mode. The ARM Cortex-M MPU is an example of such an MPU and code examples and text that follow are based upon it. However, this invention is not limited to the ARM Cortex-M MPU. It applies to all MPUs supporting a BR.

The method presented herein provides a means to control the BR in order to create isolated privileged tasks (ptasks), which are an important step in the process of converting ordinary tasks to unprivileged tasks (utasks). Isolated ptasks provide improved security and reliability in privileged mode and are also part of the inventive subject matter. The method is applicable to new embedded projects as well as to existing devices.

The method presented in the claims supports a step-by-step process, wherein the least-trusted and most vulnerable tasks are converted to unprivileged tasks (utasks) that can access only limited regions of memory and I/O and are provided only indirect access to limited system services running in privileged mode (pmode). A utask, if hacked, is in a box from which the hacker cannot steal secret keys nor interfere with mission-critical code, security code, nor system services, all of which run in pmode. The method is applicable iteratively so that product security can be improved over time, as resources permit.

DETAILED DESCRIPTION

The following information describes a simple embodiment of the invention sufficient to explain how it works. The term "application" is understood to mean the software in an embedded device. It is assumed that the processor in the embedded device not only has a Memory Protection Unit (MPU) but also is capable of running either in pmode or in umode. It is also assumed that the processor can be switched from umode to pmode only by means of an exception or interrupt; that it supports a software interrupt instruction, which causes an exception, in order to switch from umode to pmode; and that switching from pmode to umode is easily accomplished. It is further assumed that the MPU has a BR that, when enabled, permits accessing any memory location in pmode, but not in umode.

Partitions

Figure 1:
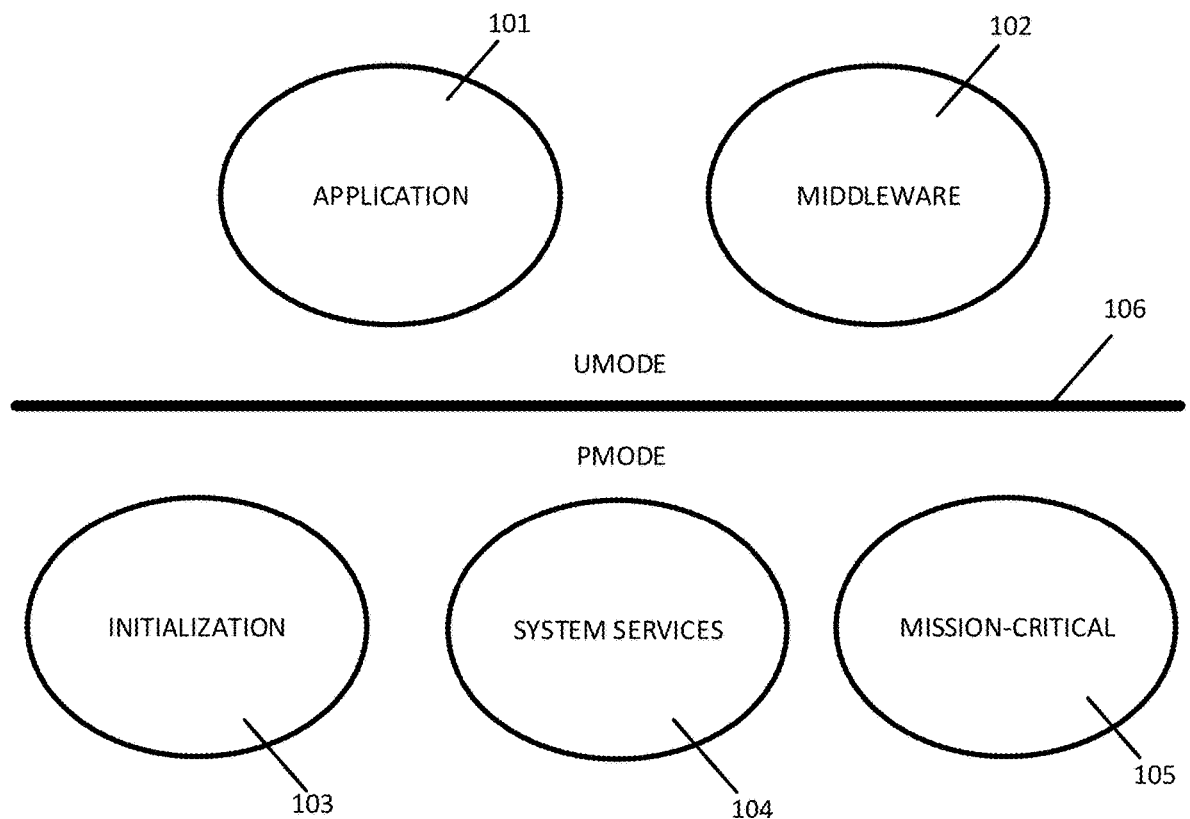
FIG. 1 shows partitioning of an application prior to porting it to a Memory Protection Unit (MPU).

Partitioning the code is the first step in converting it to an MPU. FIG. 1 shows what we might call a "first pass" partitioning—i.e. not too ambitious. In this case, there are just 5 partitions: 101 Application and 102 Middleware, which run in umode and 103 Initialization, 104 System Services, and 105 Mission-Critical code, which run in pmode. Each partition includes one or more tasks.

Initialization code 103 runs before normal task operation begins. It typically runs with the MPU off or with it on and BR enabled. Hence, this code can access anything and do anything. This is ok because it part of secure boot, which theoretically cannot be hacked. Secure boot is outside of the scope of this patent.

System services 104 include exception handlers, Interrupt Service Routines (ISRs), the Real Time Operating System (RTOS), and security software with its secret keys. Mission-critical software 105 is typically a small amount of software that does the main job of the product. These are trusted software. Pmode code is protected from umode code by MPU regions backed up by the privileged processor state and a software interrupt (SWI) API to system services. The heavy line 105 represents the barrier between umode and pmode.

FIG. 1 represents the goal of an MPU conversion. A typical unprotected system would start with all of its partitions below the heavy line—i.e. everything accessible by everything. Such a system lacks security because once its most vulnerable code in 101 or 102 is hacked, secret keys can be stolen and malware can be implanted in the other partitions, such as the mission-critical partition.

The MPU conversion goal is to move partitions 101 and 102 above the line, where if hacked, they cannot access partitions below the line. In a typical system, partitions 101 and 102 might constitute 90% of the code, and partitions 104 and 105 would contain only a small amount of carefully-written code that is not easily hacked. External access paths, such as the Internet and USB, are isolated to partitions 101 and 102. I/O used by mission-critical code is normally contained within the embedded product and thus not easily accessible to hackers.

One of the tenets of security is that no security is perfect. If a hacker is able to gain access to the circuitry inside of the embedded product, there are techniques such as raising and lowering inputs or voltages to break into pmode. In such a case, isolated ptasks make the hacker's job a little more difficult—maybe enough to frustrate the attack.

Memory Protection Arrays

Figure 2:
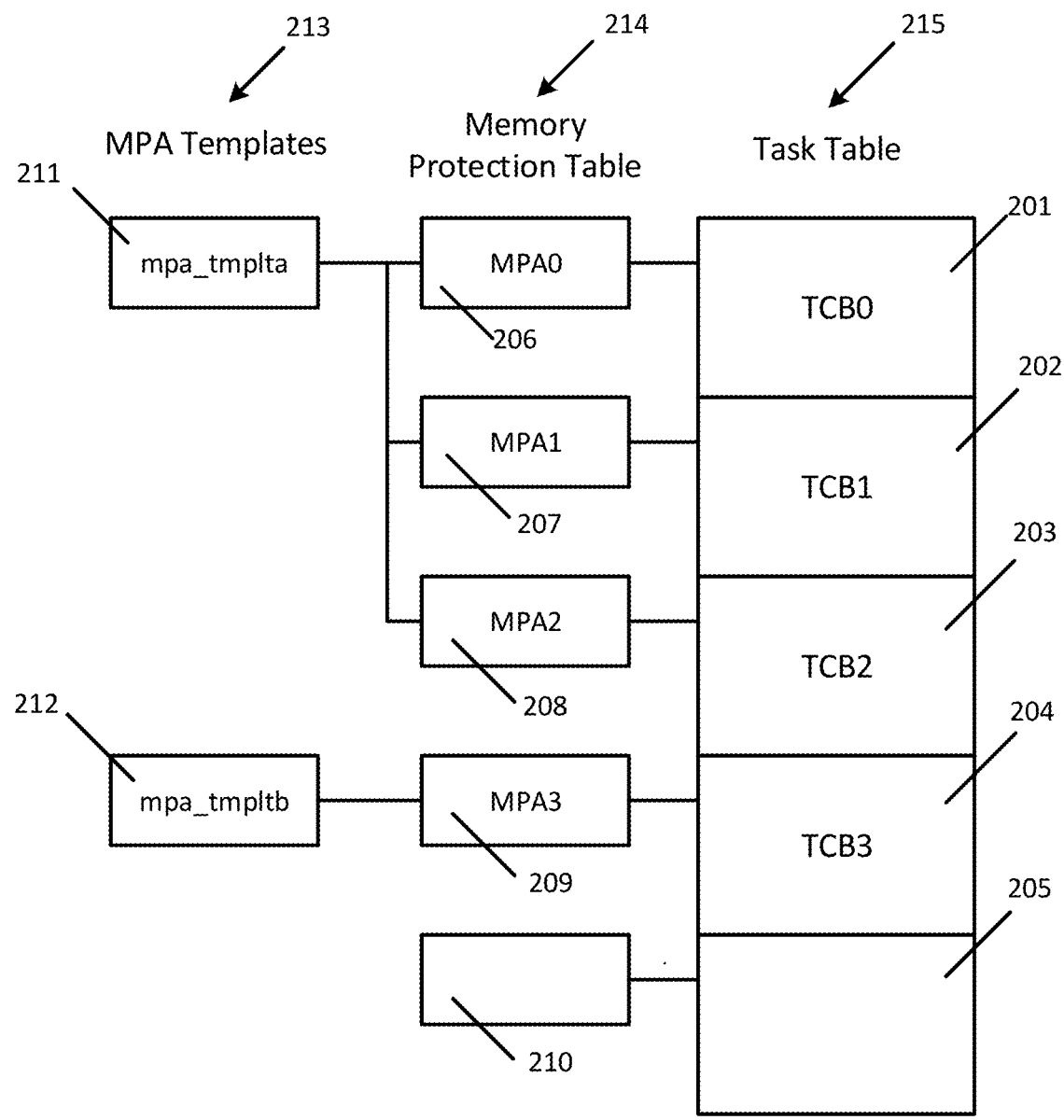
FIG. 2 shows the relationships of Memory Protection Arrays (MPAs) to Task Control Blocks (TCBs) and of MPA templates to MPAs.

FIG. 2 shows the relationship between Task Control Blocks (TCBs), Memory Protection Arrays (MPAs), and MPA templates. In a multitasking system, each task has a TCB. The TCBs 201, 202, 203, and 204 are in the Task Table 215 in the order that their tasks were created. TCB 205 is empty, awaiting a task creation. Each task has its own MPA. The MPAs 206, 207, 208, and 209 are in the same order in the Memory Protection Table 214 as the TCBs are in the Task Table 215. Note the empty MPA 210 corresponding to the empty TCB 205. Each MPA is a replica of the dynamic portion of the MPU (shaded area in FIG. 3) when its associated task is running. An MPA is loaded into the MPU by the scheduler when its task is dispatched.

Also, as shown in FIG. 2, MPA templates determine the contents of the MPAs. MPA template 211 is loaded into MPAs 206, 207, 209. This would tend to be the case for tasks in the same partition, although they need not have the same templates and may just share a few regions. In contrast, MPA template 212 is used only by MPA 209.

Each MPA is an array of structures consisting of two 32-bit fields named rbar and rasr. These are exact copies of the MPU RBAR and RASR registers in each MPU slot, except that the valid bit is set in rbar, but not in RBAR. The following is an example of a template:

is set in the corresponding TCB. This tells the task scheduler to turn off BR for this task, if it is to run in pmode.

Memory Protection Unit (MPU)

Figure 3:
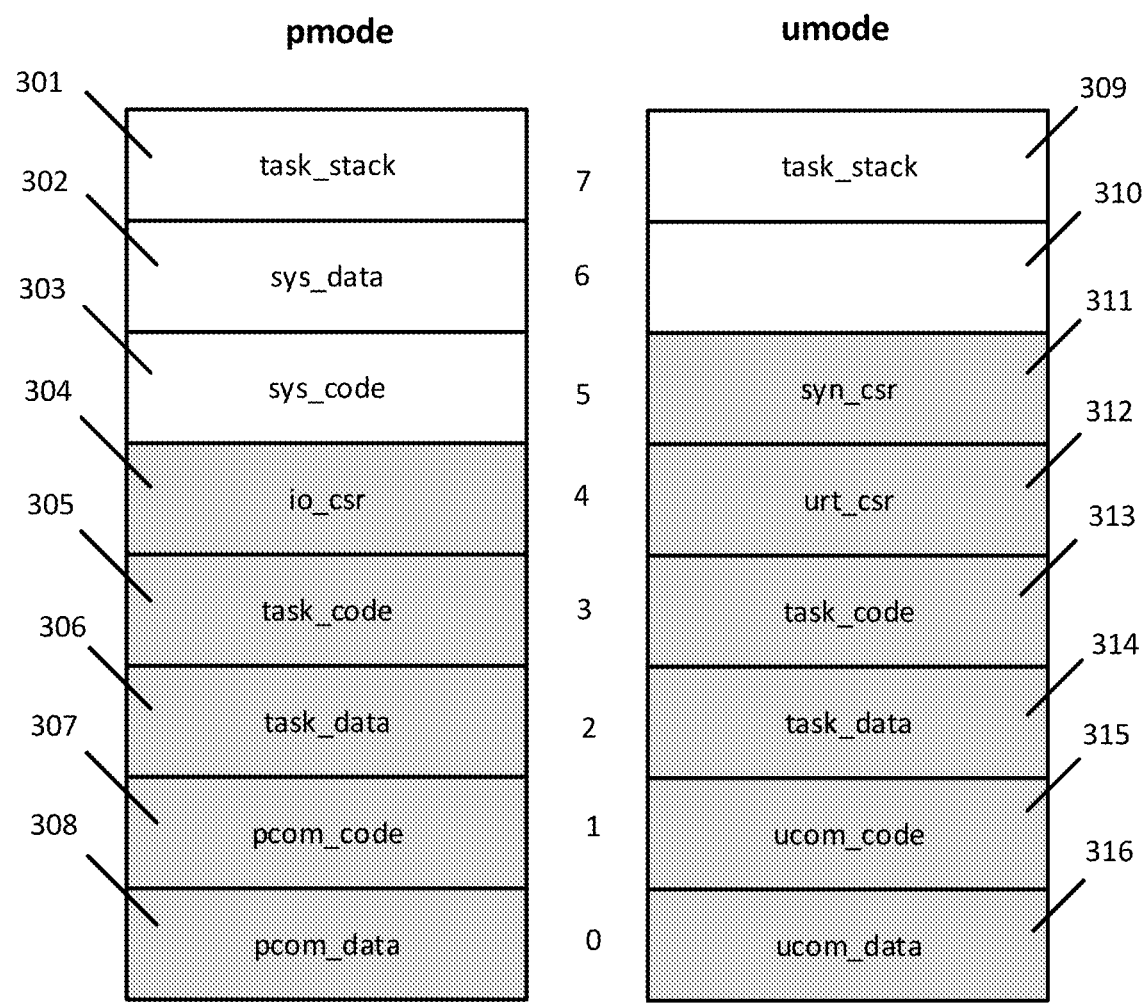
FIG. 3 shows MPU regions for the same task, while running, after the privileged mode (pmode) conversion step and then after the unprivileged mode (umode) conversion step.

FIG. 3 shows the MPU for the same task when the task has been ported to run in isolated pmode, and then when the task has been ported to run in umode. This MPU has 8 slots, each of which may contain a region or may be empty and thus ignored.

Looking first at the MPU pmode version, region 301 is reserved for the task stack region, which is managed by the scheduler. This region allows immediate detection of task stack overflows and it prevents code execution from the task stack. Both of these are common hacker techniques. Region 301 is reloaded whenever a task switch occurs.

Region 302 contains sys_data and region 303 contains sys_code. In combination, they allow turning BR off in pmode while still permitting interrupts and exceptions to be processed. This enables isolated ptasks, which are an important step in the MPU conversion process discussed below.

Region 304 is the I/O Command and Status Register region. It permits I/O access and control. Region 305 contains all code specific to this task and region 306 contains all data specific to this task. Region 307 includes system service functions (see FIG. 1), which are directly accessed in pmode and region 308 includes global data needed by these services. In addition, region 307 includes code such as subroutines and region 308 includes data such as global variables that are common between this ptask and other ptasks.

Looking now at the MPU umode version, Region 309 is identical to Region 301, Region 310 is empty. Region 304 has been split into region 311 for a USB host controller and region 312 for a UART controller. This provides better security because peripherals not needed by this task can no longer be accessed by it. This is possible because sys_data and sys_code are not needed in umode, which is a feature of this invention. Region 313 is identical to region 305 and region 314 is identical to region 306.

Region 315 is generated from region 307 by replacing system service functions with system service shells; these generate software interrupts to the system service functions that run in pmode (see 104 in FIG. 1). Shells are provided only for safe functions. Other functions (e.g. System-Sleep( ) map to the privilege violation handler. Region 316 is generated from region 308 by removing privileged data needed by the system service functions. Most of the other

```
const MPA mpa_tmplt_usbh =
{
  {RA("ucom_data")   | V | 0, RW_DATA  | N57   | RSIC(udsz)    | EN},
  {RA("ucom_code")   | V | 1, UCODE    | N7    | RSIC(ucsz)    | EN},
  {RA("usbh_data")   | V | 2, RW_DATA          | RSIC(usbdsz)  | EN},
  {RA("usbh_code")   | V | 3, UCODE    | N67   | RSIC(usbcsz)  | EN},
  {RA("syn_csr")     | V | 4, RW_DATA          | RSIC(synsz)   | EN},
  {RA("url_csr")     | V | 5, RW_DATA          | RSIC(urlsz)   | EN},
};
```

(RA is the Region Address macro, RSIC is the Region Size Index from Constant macro; RW_DATA, etc. are attribute macros, which are self-explanatory.) This template corresponds to the umode MPU structure in FIG. 3. There is a similar template for the pmode MPU structure in FIG. 3.

Templates are created by programmers to specify region locations, sizes and attributes that limit task accesses. When a template is loaded into an MPA, the MPA valid flag, mpav, common subroutines in region 307 carry over to region 315 and most of the other global variables in region 308 carry over to region 316.

Step-by-Step MPU Security Conversion

Conversion starts by identifying the most untrusted or vulnerable task or partition to isolate from the rest of the system. Significant gains can be made by isolating one bad actor at a time and thus improve security incrementally.

1. Start

Call MPU initialization from the beginning of the startup code. This turns on the MPU and enables its BR. The application should run normally.

2. System Regions

Next, define .sys_code and .sys_data regions. sys_code contains all handler and ISR code. sys_data contains the system stack and global data used by the handlers and ISRs. Enable loading sys_code into MPU[5] and sys_data into MPU[6] in the MPU initialization function. These regions are present for every ptask as shown in FIG. 3. Note: Other MPU slots could be used, if preferred.

3. Super regions

The next step is to define super regions for all memories and memory-mapped I/O areas in the system. This can be done by consulting the linker map to determine starting addresses and sizes. The following template is an example:

```
const MPA mpa_tmplt_sr =
{
    {0x20000000 | V | 0, PRW_DATA | N67 | (0x11 << 1) | EN}, /* SRAM in use */
    {0x00200000 | V | 1, PCODE    | N57 | (0x11 << 1) | EN}, /* ROM in use */
    {0xC0000000 | V | 2, PRW_DATA       | (0x10 << 1) | EN}, /* RAM in use */
    {0x40040000 | V | 3, PRW_DATA       | (0x11 << 1) | EN}, /* Synopsys HS */
    {0x40011000 | V | 4, PRW_DATA       | (0x09 << 1) | EN}  /* UART1 */
};
```

When a ptask's MPA is loaded, its mpav flag is set causing it to run with BR off; all tasks without loaded MPAs run with BR on. The sys_code and sys_data regions handle interrupts and exceptions that occur when a ptask is running. Note that handlers, ISRs, and other tasks are running as they were before, but this task is running with reduced memory regions and these regions have strictly controlled attributes (PRW_DATA, etc.) This is a significant security gain for this task.

4. pmode operation

The next step is pmode operation. The first job here is to group code and data into task-specific regions, as shown by task_code 305 and task_data 306 in FIG. 3. Next, define common code and data regions to hold RTOS and other system services and to hold common data needed by them, as shown by pcom_code 307 and pcom_data 308 in FIG. 3. Finally, define an I/O region 304, if it is needed by the task.

Then, create mpu_tmplt_task and add code to load it into the MPA of taskA, thus replacing mpa_tmplt_sr for this task. The task is now an isolated ptask. Memory Management Faults (MMFs) will normally occur when the system is run. These are eliminated by adjusting memory regions or making code adjustments. The capability to do this in pmode, which is easier than in umode, is a unique feature and an important benefit of this invention.

5. umode operation

The final step is conversion to umode. The jobs here are to derive the umode template, to load it into the task's MPA, to set the task's umode flag, and to include the shell mapping header file ahead of all task_code that calls system services. This forces the SWI API to be used by the utask for these calls. Now, whenever this task is started or resumed, the processor will run in umode.

As shown in FIG. 3 and discussed above in the MPU section, most regions come over from pmode as is and the others require only minor modifications. So, the main problem in this step is to deal with system services that are not permitted in umode. In complicated systems, trying to deal with region definitions and service limitations simultaneously can be overwhelming. Thus, the pmode step is an important part of a practical MPU security conversion process, without which the conversion might not be done due to being judged too difficult.

When a task's umode flag is set, BR is automatically set when the task runs. BR has no effect in umode but it permits interrupts and exceptions to be handled when a umode task is interrupted. Thus sys_code 302 and sys_data 303 are not needed by utasks, and their slots can be used to reduce region sizes for better security. Hence, region 304, which permits access to all peripherals, has been replaced with regions 311 and 312, which are each limited to one peripheral. This increase in security is an additional benefit of this invention. As shown in FIG. 3, the MPA (shaded region) becomes larger.

Summary

It should be appreciated that the foregoing is but one embodiment of this invention chosen here to present a clear description of all of the features of the invention. However, other embodiments are possible depending upon hardware and application details

I claim:

1. A method to improve the security of existing or under-development embedded system product software, comprising:

running tasks comprising partitions of said embedded system product software in processor privileged mode (pmode) with a system code region, a system data region, and task regions loaded into a memory protection unit background region turned off, and said system regions permitting said processor to service interrupts and exceptions that preempt said privileged task;

running tasks comprising partitions of said embedded system product software in processor unprivileged mode (umode) with task regions loaded into a memory protection unit with background region turned on to permit said processor to service said interrupts and said exceptions that preempt said unprivileged task, thus freeing said system regions of said memory protection unit to be used for additional said task regions;

loading a memory protection array for each said task from a template with said regions specific to said task, setting a memory protection array valid (mpav) flag in the task control block of said task to indicate that said memory protection array has been loaded, and loading said memory protection array into said memory protection unit when said task is started or resumed;

setting the umode flag in said task control block of said task designating that said task will run in unprivileged mode when said task is started or resumed;

utilizing a step-by-step method of developing new tasks in said privileged mode at first with said background region on, then with said background region off, and finally running said tasks in said unprivileged mode with said background region on, whereby full isolation between said unprivileged tasks is achieved, mapping each system function call from said unprivileged task to a parameter of a software-generated exception wherein said function, if allowed, is executed and said function, if not allowed, is treated as a privilege violation and such mapping can vary depending upon the trustworthiness of said unprivileged task;

allowing some tasks of said embedded system product software to permanently run in said privileged mode, with said background region off, for security functions and for mission-critical functions, whereby access to said tasks are protected by said processor privileged mode.

2. The method of claim 1, wherein said background region is turned off when said task with said mpav flag is true and said umode flag is false is started or resumed, whereby it runs as said privileged task.

3. The method of claim 2, wherein converting existing code to using said memory protection unit is simplified by first converting existing tasks to said privileged tasks, which allows creating and testing said task regions before taking the final step of converting to said unprivileged tasks.

4. The method of claim 2, wherein said privileged tasks improve the security and reliability of privileged mode code due to their being isolated from each other and from all other code and data outside of their regions.

5. The method of claim 2, wherein said interrupt service routines and said exception handlers can preempt said privileged tasks and run because said memory protection unit has said system code and said data regions for them.

6. The method of claim 1, wherein said background region is turned on when said task with said mpav flag is true and said umode flag is true is started or resumed and said processor is switched to unprivileged mode.

7. The method of claim 6, wherein said background region has no effect in said unprivileged umode, yet allows said interrupts and said exceptions to be serviced when they switch said processor to said privileged mode wherein said background region is effective, thus said system code region and said system data region are not needed for said unprivileged tasks, thus increasing available regions of said memory protection unit for said unprivileged tasks.

8. The method of claim 7, wherein if said system code region and said system data region are overwritten in said memory protection unit, they are put into said memory protection arrays of all said privileged tasks so they will be restored in said memory protection unit when said privileged tasks run.

9. The method of claim 6, wherein a header file that maps system service functions to software interrupt shell functions is put ahead of all said unprivileged task functions, and each said shell function calls a software interrupt instruction, which triggers an exception that branches to a handler in said privileged mode and where the parameter of said software interrupt instruction is used to identify said service to call, said service is called by said handler, and the return value of which is passed back via said handler and said shell function to said unprivileged task.

10. The method of claim 9, wherein said system services not permitted for said unprivileged tasks are mapped to a privilege violation handler, to record said violation and to initiate said task or said embedded system recovery.

11. The method of claim 9, wherein different versions of said header file are more restrictive for less-trusted said unprivileged tasks and map more said system services to said privilege violation handler.

12. The method of claim 1, wherein if said memory protection array of said task is not loaded then its said mpav flag is not set and said task runs as a said privileged task with said background region on, whereby proven, mission-critical code need not be modified to run with a memory protection unit.

* * * * *